(12) United States Patent
Landrot

(10) Patent No.: US 6,213,027 B1
(45) Date of Patent: Apr. 10, 2001

(54) RAILWAY VEHICLE BOGIE MADE OF COMPOSITE MATERIAL AND PROCESS FOR MANUFACTURING SUCH A BOGIE

(75) Inventor: Alain Landrot, Le Creusot (FR)

(73) Assignee: Alstom Holdings, Paris (FR)

( * ) Notice: Subject to any disclaimer, the term of this patent is extended or adjusted under 35 U.S.C. 154(b) by 0 days.

(21) Appl. No.: 09/343,413

(22) Filed: Jun. 30, 1999

(30) Foreign Application Priority Data

Jul. 6, 1998 (FR) .................................................. 98 08621

(51) Int. Cl.$^7$ ........................................................ B61F 3/00
(52) U.S. Cl. ................................. 105/182.1; 105/199.1; 105/200; 105/226; 105/230
(58) Field of Search .......................... 105/182.1, 206.1, 105/200, 226, 227, 157.1, 199.1, 230

(56) References Cited

U.S. PATENT DOCUMENTS 3,903,811 * 9/1975 Sinclair ............................. 105/182.1
4,773,334 * 9/1988 Nowak et al. ..................... 105/182.1
5,085,151 * 2/1992 Wako et al. ....................... 105/206.1

FOREIGN PATENT DOCUMENTS 0568044   11/1993   (EP) .

* cited by examiner

Primary Examiner—Stephen Avila
Assistant Examiner—Lars Olson
(74) Attorney, Agent, or Firm—Dowell & Dowell, P.C.

(57) ABSTRACT

A railway vehicle bogie made of composite material which includes at least one elongated rigid support secured in a chassis made of composite material. The support is adapted to removably receive fasteners for mounting functional elements of the bogie at a plurality of locations along the length of the support. The process includes disposing the elongated rigid support in a mold before the bogie chassis is cast.

12 Claims, 4 Drawing Sheets

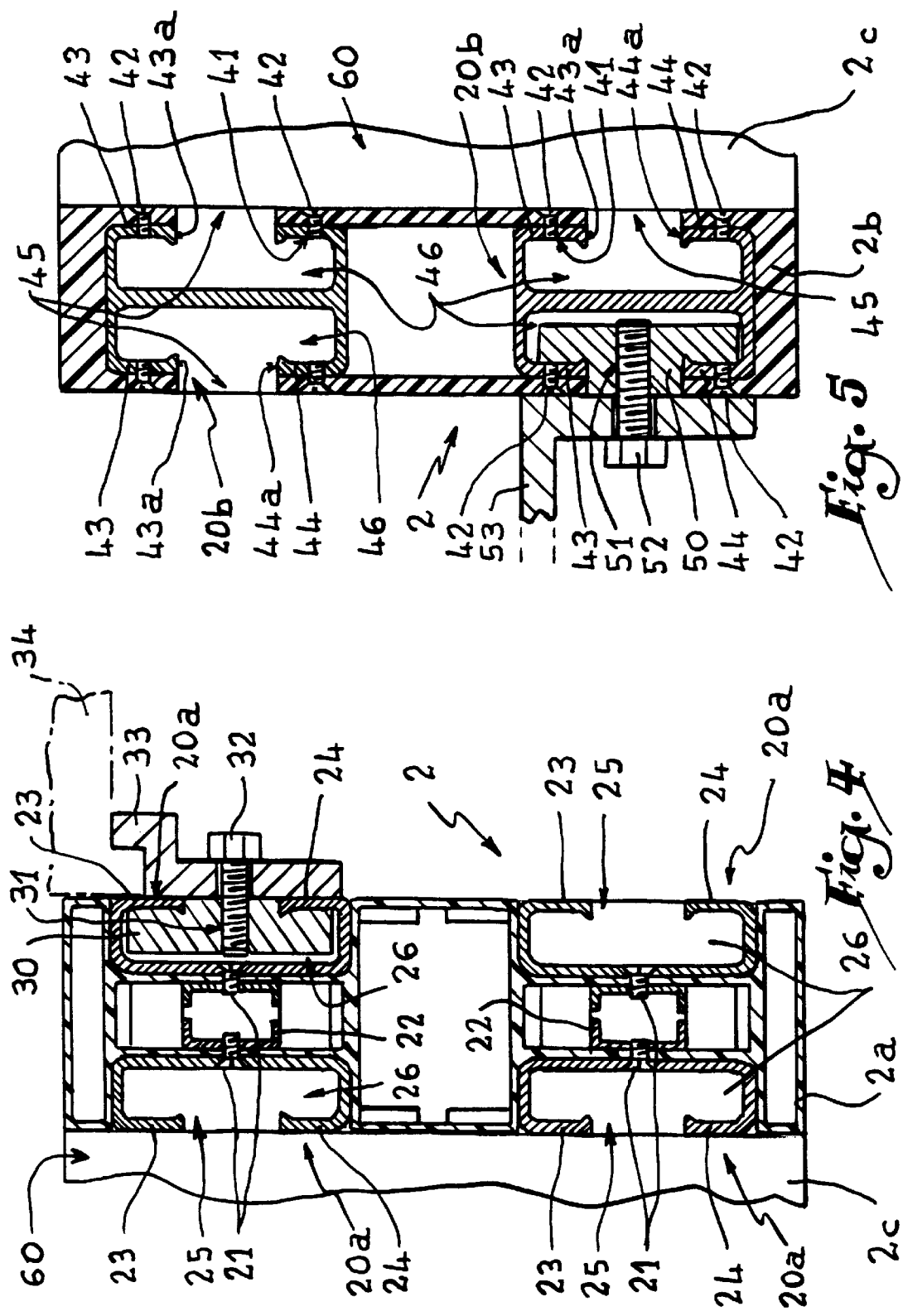

RAILWAY VEHICLE BOGIE MADE OF COMPOSITE MATERIAL AND PROCESS FOR MANUFACTURING SUCH A BOGIE

BACKGROUND OF THE INVENTION

1. Field of the Invention

The present invention relates to a bogie for railway vehicle and to a process for manufacturing such a bogie.

2. Brief Discussion of the Related Art

It is known to produce a railway vehicle bogie in the form of massive parts made of steel or of welded structures. These massive parts and welded structures are rigid and heavy. In particular, they be must be equipped with suspension and vibration-damping systems.

European Patent Application 0 031 008 discloses a railway vehicle bogie comprising H-shaped cross-pieces made of composite material. These cross-pieces do not allow the assembly of accessory or safety elements such as a motor, a braking system or a control system.

In the case of a bogie made of composite material, it may be envisaged, for fastening the sub-systems mentioned hereinabove, generically called "functional elements" of the bogie, to use metallic inserts fixed with respect to the bogie. Such inserts must be positioned in the bogie as a function of its future use or of the functional elements that it has to support. In other words, no adaptation of the bogie to the functional elements that it supports can be envisaged after these inserts have been positioned. This results in a complex management of the process of concept and manufacture of the bogies of which the structure is fixed as far as the subsequent fixation of functional elements is concerned, from the beginning of manufacture thereof. This lack of modularity is detrimental from the economical, and also from the technical standpoint, as it is detrimental to the interchangeability of the structures of the bogies.

It is an object of the present invention to overcome these drawbacks by proposing a bogie made of composite material and a process of manufacturing such a bogie which make it possible to attain a satisfactory modularity for fixing the functional elements of the bogie.

SUMMARY OF THE INVENTION

To that end, the invention relates to a railway vehicle bogie made of composite material, characterized in that it comprises at least one elongated rigid support secured in a structure made of composite material, this support being adapted to removably receive means for fastening functional elements of the bogie, at a plurality of locations distributed over its length.

Thanks to the invention, the functional elements of the bogie may be fixed at different spots, which makes it possible to use the modular nature of the bogie by adapting the configuration of these functional elements when designing and finally assembling the bogie, and even when subsequently adding a functional element. The invention also makes it possible to reduce the time for development of a new bogie, concerning the positioniong of the functional elements, while this aspect generally takes a long time in view of the dimensions of these elements.

According to a first advantageous aspect of the invention, the support is formed by a hollow rail inside which at least one retaining member provided with at least one means for cooperation with a member for fixing and/or supporting a functional element of the bogie, is adapted to move. This retaining member may be constituted by a slide block provided with at least one tapping for receiving a locking screw. The displacement of the slide block inside the rail allows a fine adjustment of the position of a functional element, while the tightening of a fastening screw in the tapping of the slide block has the effect of immobilizing this slide block with respect to the rail. When a plurality of functional elements are provided, it suffices to house a plurality of slide blocks in the rail.

According to another advantageous aspect of the invention, the support is formed by a metal rail with a cross-section in the form of a C or double C. This geometry of the rail makes it possible to define a volume inside which a slide block may be disposed. The rail advantageously comprises two flanges provided with a flattened free edge on which the slide block may move in abutment.

According to another advantageous aspect of the invention, the bogie comprises a chassis extending transversely with respect to the normal direction of movement of the vehicle and in which the elongated rigid support is immobilized. In that case, the chassis may be provided to be of substantially parallelepipedic shape and provided with a recess defining two beams which also extend perpendicularly to this direction of movement and are each provided with at least one elongated rigid support. These two beams may thus serve for fastening the functional elements of the bogies.

The invention also relates to a process for manufacturing a bogie as described hereinabove and, more specifically, to a process which consists in disposing, in a mold for manufacturing the bogie before said bogie is cast, an elongated rigid support adapted to removably receive, at a plurality of locations distributed over its length, means for fastening functional elements of the bogie. Thanks to the process of the invention, the elongated rigid support is integrated in the bogie right from the start of its manufacture, while it may be immobilized with respect thereto by any appropriate means and, in particular, by moulding, screwing or gluing.

BRIEF DESCRIPTION OF THE DRAWINGS

The invention will be more readily understood on reading the following description of an embodiment of a railway vehicle bogie in accordance with its principle, given solely by way of example and made with reference to the accompanying drawings, in which:

FIG. 4 is a section along line IV—IV in FIG. 3; and

FIG. 5 is a section along line V—V in FIG. 3.

DESCRIPTION OF PREFERRED EMBODIMENT

Figure 1:
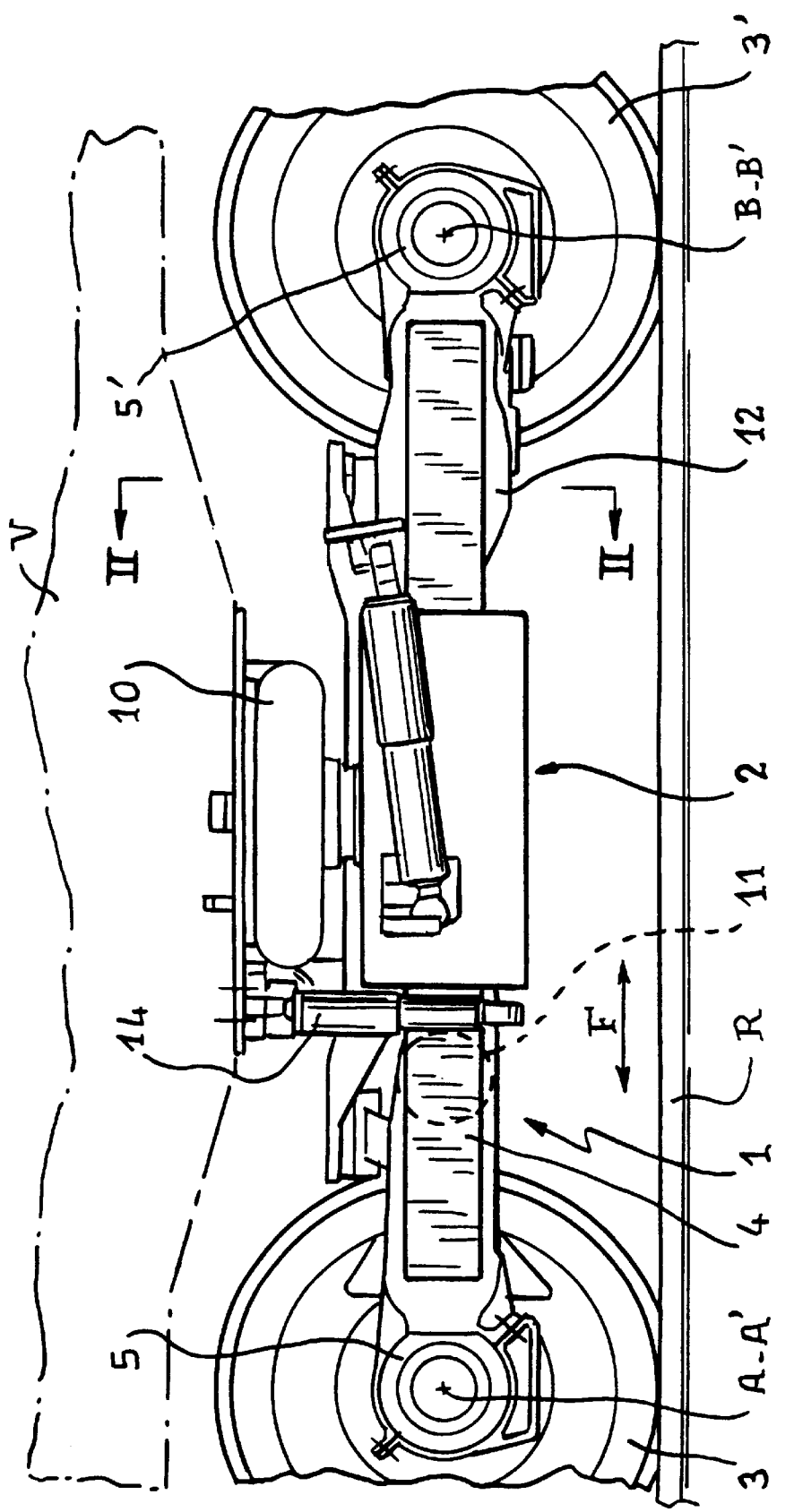
FIG. 1 is a side view of a railway vehicle bogie according to the invention.
Figure 2:
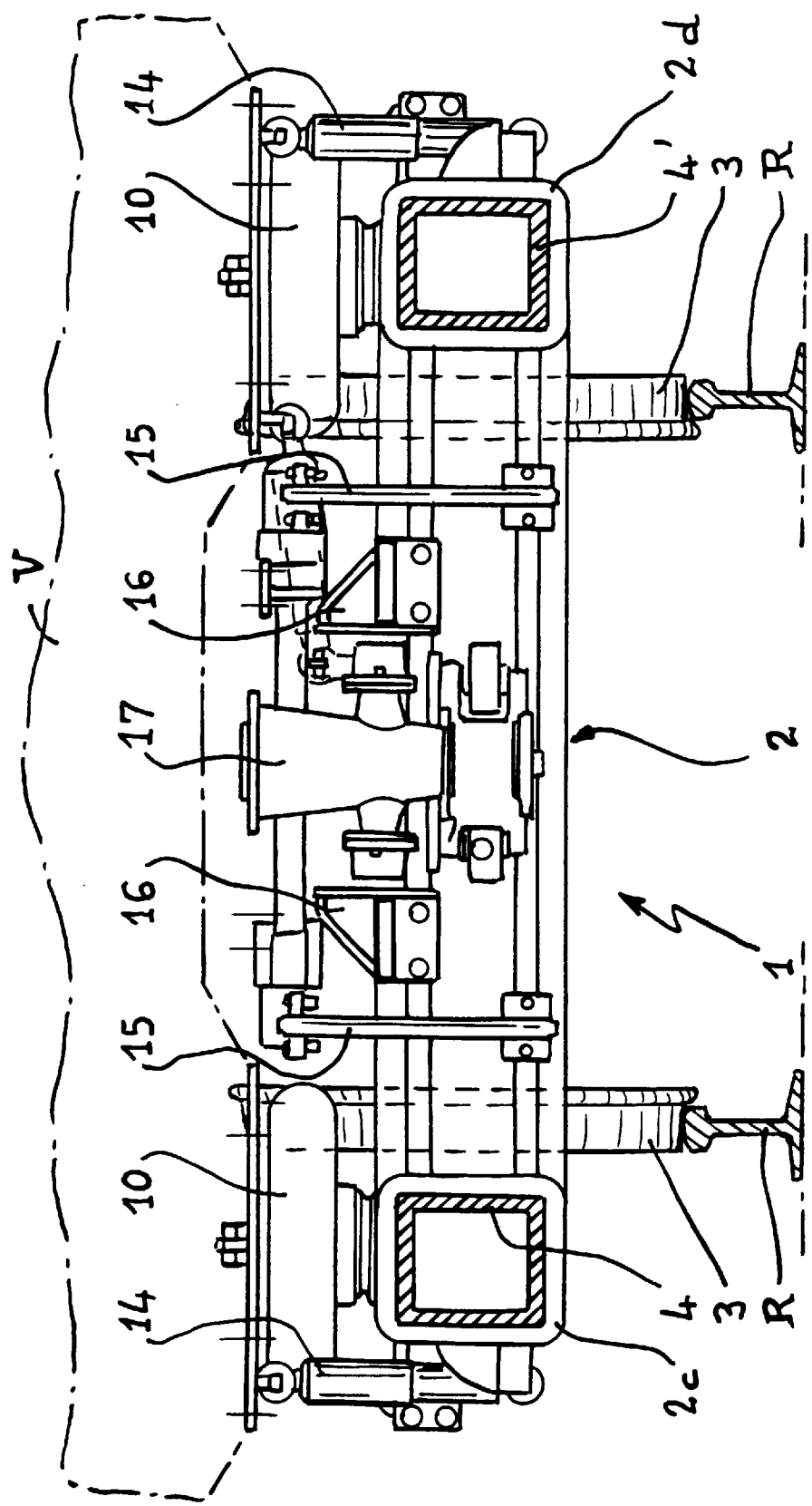
FIG. 2 is a section along line II—II in FIG. 1.

Referring now to the drawings, the bogie 1 shown in FIG. 1 is intended to support a railway vehicle V, shown in dashed and dotted lines, in abutment on rails of which only one, referenced R, is visible in FIG. 1. This bogie 1 is supported by two wheel and axle sets 3 and 3' grouped on axles represented by axes of rotation A–A' and B–B' of the wheels. Side members 4 and 4' are provided to support the chassiss 2 in abutment on axle boxes 5 and 5' of the wheels 3 and 3'.

The chassis 2 and the side members 4 and 4' are made of composite material, preferably based on epoxide or phenolic resin reinforced with glass, carbon, aramid or equivalent fibers. In this way, the bogie is substantially lighter than conventional steel bogies, while it presents excellent mechanical properties and its cost may be relatively low.

Secondary suspension elements 10 are provided to be interposed between the chassis 2 and the box body of the vehicle V. A drive motor 11 and a braking system 12 are also supported by the chassis 2. Shock absorbers 14 are interposed between moving parts of the bogie 1. Connecting rods 15 are articulated on the chassis 2 while stops 16 are disposed around a drive pin 17 in order to limit the transverse stroke thereof. Elements 10 to 17 constitute functional elements of the bogie 1.

Depending on the type of bogie, whether it be bearing or driving, on the equipment specific to this type of bogie and on the optional equipment of the vehicle V, the functional elements 10 to 17 or equivalent may be of variable size and shape, this having an influence on their implantation with respect to the chassis 2.

In order to allow such implantation and in accordance with the invention, the chassis 2 is equipped with metal rails or slideways 20 along which the elements 10 to 17 may be fixed. Other elements connected with the functioning of the bogie may also be fixed on the rails 20.

These rails 20 are provided to be integrated in the structure of the chassis 2, more precisely inside two beams 2a and 2b of the chassis which extend substantially perpendicularly to the direction of movement of the vehicle V on the rails R, represented by arrow F in FIG. 1.

The rails 20a fixed in the beam 2a are visible in section in FIG. 4. There are four rails of substantially C-shaped cross-section which are immobilized with respect to the beam 2a thanks to locking screws 21. Metallic inserts 22 are distributed in the length of the beam 2a to receive the screws 21 and thus allow a firm immobilization of the rails 20a with respect to the beam 2a.

The cross-section of the rails 20a is such that they have two flanges 23 and 24 exposed on the lateral faces of the beam 2a and defining therebetween an opening 25.

A plurality of slide blocks 30 are disposed in the inner volume or channel 26 of the rail 20a so as to be able to move in translation along the rail. Each slide block 30 is provided with a central tapping 31 placed at the level of the opening 25 so as to receive a fastening screw 32 which, by tightening in the tapping 31, makes it possible to immobilize a support 33 shaped to wedge a stirrup element 34 of the motor 11 against a flange 23 of the rail 20a. The positioning of the motor 11 with respect to the beam 2a is effected by moving the or each slide block for fastening the support 33 over the length of the rail 20a. In this way, the motor 11 may be fixed at different locations along the rail 20a.

Figure 3:
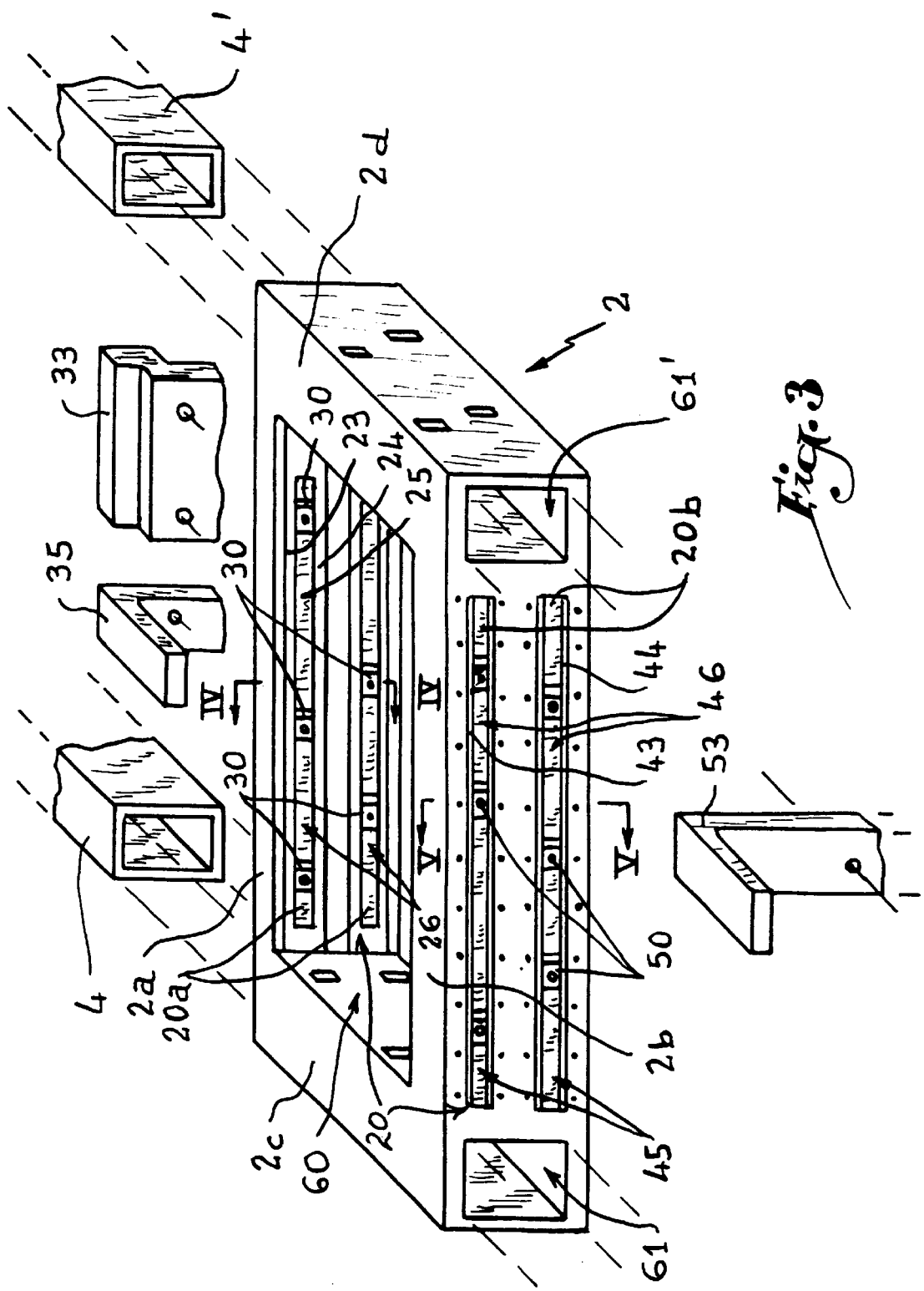
FIG. 3 schematically shows, in exploded perspective view, certain structural elements of the bogie of FIGS. 1 and 2.

In the same way, a brake bracket 35, visible in FIG. 3, may be mounted on the rails 20a in different positions, as a function of the location of a slide block 30, over the length of the flanges 23 and 24. It will be understood that the positioning of the support 33 and of the bracket 35 may be adjusted as a function of the bulk of the elements that they support.

The rail system used in the beam 2b is partially visible in FIG. 5. The rail 20b of this part of the chassis has a cross-section in the form of a double C and is disposed substantially completely inside the beam 2b, while its flanges 43 and 44 are provided with tappings 41 for receiving locking screws 42. However, the flanges 43 and 44 of the rail 20b define a flattened free edge 43a or 44a intended to overlap on the parts of the beam 2b in which the screws 42 are inserted. Reference 45 denotes the opening of the inner volume or channel 46 of the rail 20b defined between the edges 43a and 44a.

A plurality of slide blocks 50 are disposed in the inner volume 46 of the rail 20b so as to be able to move inside this inner volume in abutment on one of the free edges 43a and 44a. Each slide block 50 is provided with a central tapping 51 intended to receive a fastening screw 52, which, when tightened, immobilizes a support 53.

It will be understood that a plurality of tapped slide blocks 50 may be introduced in each rail 20b, with the result that a plurality of fixing means such as screws for locking the structures 33 or 53 may be positioned at a plurality of locations over the length of the beam 2b. In fact, each element 33 or 53 may be positioned at an infinite number of locations over the length of the rail 20b thanks to the continuous displacement of the slide block 50.

It will also be understood that, when it is not necessary to provide a support element 33, 53 or equivalent, no member projects outside the beams 2a and 2b, even if the rails 20b house slide blocks 30 or 50.

As is clearly visible in FIG. 3, the chassis 2 is substantially parallelepipedic in shape and comprises a central recess or open area 60 of which the two beams 2a and 2b constitute two borders. The other two borders of the recess 60 are constituted by two hollow beams 2c and 2d connected to beams 2a and 2b by the continuity of the composite material forming the chassis 2.

The respective inner volumes 61 and 61' of the hollow beams 2c and 2d constitute housings for receiving the side members 4 and 4'. These housings 61 and 61' may be traversed right through by the side members 4 and 4' in order to connect the axle boxes 5 and 5'.

The process of manufacture of a bogie as described hereinabove consists essentially in providing to integrate the rails 20 in the chassis 2 as from its molding hase. To that end, one or more rails are disposed in the mold, in the desired configuration. In accordance with the variants of the process of molding, it may be provided to mold the rails in the chassis or to immobilize them with respect to the chassis by gluing or by screwing, as described with reference to FIGS. 3 and 4.

The chassis 1 has been described with two types of rails. It is obvious that it may comprise only one type of rail, as shown in FIG. 3 or as shown in FIG. 4, or, on the contrary, more than two types of rails.

What is claimed is:

1. A bogie for a railway vehicle wherein the bogie includes a chassis formed of a composite material, means for mounting said chassis to at least two spaced axles supported on wheels, at least one elongated rigid support secured to said chassis and extending generally parallel to said at least two axles, means carried by said at least one rigid support for securing functional elements to said at least one rigid support, and said means for securing being adjustable to a plurality of positions along a length of said at least one rigid support.

2. The bogie of claim 1 in which said at least one rigid support is formed as a hollow rail and said means for securing includes at least one retaining member slidably adjustable within said at least one hollow rail and fastening means for securing said functional elements to said at least one retaining member.

3. The bogie of claim 2 wherein said at least one retaining member is a slide block having at least one tapping for selectively receiving said fastening means.

4. The bogie of claim 1 wherein said at least one rigid support is formed as a hollow rail having a C-shaped cross section.

5. The bogie of claim 4 wherein said at least one retaining member is a slide block provided with at least one tapping for receiving said fastening means and said hollow rail includes spaced opposing flanges having flattened face edges.

6. The bogie of claim 1 wherein said at least one rigid support is formed as a hollow rail having a double C-shaped cross section.

7. The bogie of claim 6 wherein said at least one retaining member is a slide block provided with at least one tapping for receiving said fastening means and said hollow rail includes spaced opposing flanges having flattened face edges.

8. The bogie of claim 1 wherein said at least one elongated rigid support is fixedly mounted within said chassis.

9. The bogie of claim 8 wherein said chassis is generally parallelepipedic in configuration including two beams which extend generally parallel to said axles, each of said beams including at least one elongated rigid support member.

10. A process for manufacturing a railroad vehicle bogie from composite material including the steps of:
   a) providing a mold in which a chassis of the bogie is to be cast;
   b) disposing within the mold at least one elongated rigid support of generally hollow cross section which support is adapted to removably secure functional elements thereto; and
   c) forming the chassis by introducing composite material within the mold about said at least one elongated rigid support such that an elongated opening is created to communicate with the hollow elongated rigid support.

11. The process of claim 10 wherein the elongated rigid support is molded of the composite material within said mold.

12. The process of claim 10 including fastening the at least one elongated rigid support to the chassis.

* * * * *